Dec. 19, 1967 C. R. CAMPBELL ET AL 3,359,283
RECOVERY OF DICARBOXYLIC ACID ANHYDRIDES
FROM AQUEOUS ACID SOLUTION
Filed March 13, 1961
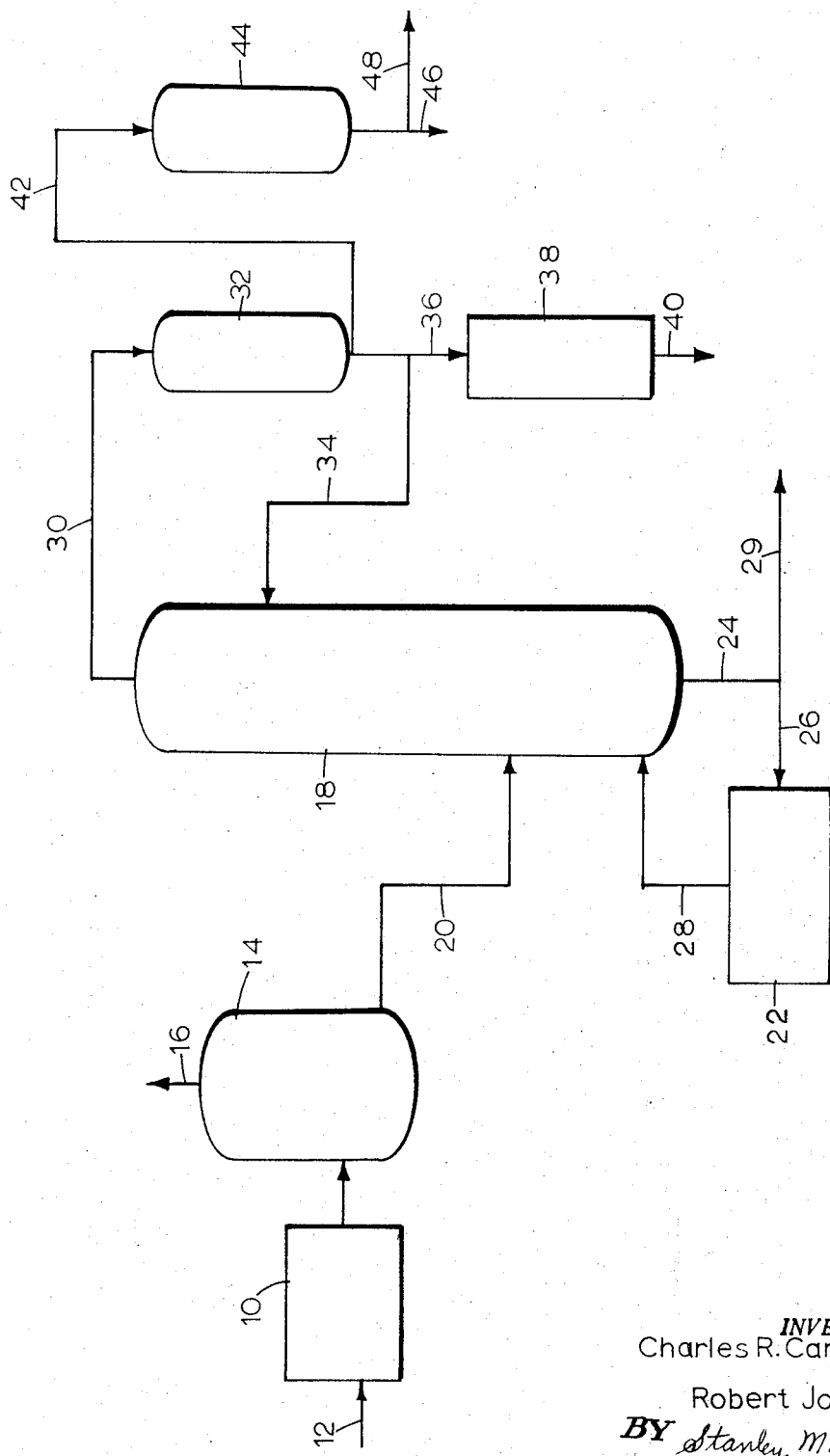
INVENTORS
Charles R. Campbell
Robert Johnson
BY *Stanley M. Tarter*
ATTORNEY

United States Patent Office 3,359,283
Patented Dec. 19, 1967

3,359,283
RECOVERY OF DICARBOXYLIC ACID ANHYDRIDES FROM AQUEOUS ACID SOLUTION
Charles R. Campbell and Robert Johnson, Pensacola, Fla., assignors, by mesne assignments, to Monsanto Company, a corporation of Delaware
Filed Mar. 13, 1961, Ser. No. 95,273
14 Claims. (Cl. 260—345.9)

This invention relates to a method for the reclamation of organic dibasic acids from certain process streams. More particularly, the present invention relates to a method of producing succinic anhydride and glutaric anhydride and separating these anhydrides from a mixture of dibasic acids including succinic acid, glutaric acid and adipic acid, such as a mixture of these acids contained in liquors originated from the mother liquors obtained in the manufacture of adipic acid wherein cyclohexanol and/or cyclohexanone is oxidized and the thus-formed adipic acid is separated, to the most extent, therefrom.

A well-known commercial method of producing adipic acid, a valuable and widely used chamical, involves a series of steps including: (1) the oxidation of cyclohexane in a liquid phase with air or other molecular oxygen-containing gas to a mixture of cyclohexanol and cyclohexanone at rather low conversion but with high yields; (2) the separation of the unoxidized cyclohexane from the mixed cyclohexanol and cyclohexanone intermediate reaction product; (3) the final oxidation of the intermediate product with a strong oxidizing acid, such as nitric acid, into adipic acid and concomitant minor amounts of other dibasic organic acids, including glutaric acid and succinic acid; and (4) the isolation of the adipic acid from these by-product organic acids, such as by crystallization. The separation of adipic acid by crystallization from the reaction mixture, as a practical matter, cannot be carried to completion; and some adipic acid, consequently, remains in solution, together with glutaric acid and succinic acid.

This mother liquor, in addition to the aforesaid organic dibasic acids, may contain relatively minor amounts of monobasic acids, as well as nitric acid and water. A typical plant stream of a large manufacturing concern, for example, may run as high as several thousand pounds per hour, with the following representative composition:

| | Percent by weight |
|---|---|
| $H_2O$ | 62.0 |
| $HNO_3$ | 9.3 |
| Monobasic acids (as acetic acid) | 0.2 |
| Adipic acid (HOAd) | 5.5 |
| Succinic acid (HOSu) | 8.7 |
| Glutaric acid (HOGl) | 12.0 |
| Catalyst | 2.2 |

Because of the difficulty in and the hitherto economics of further treatment, the mother liquor is commonly disposed of as waste, such as by burning the residual organic matter. Obviously, this represents a substantial loss of valuable chemicals, the most important of which are the by-product dibasic acids.

It has been proposed heretofore to treat a mixture of dibasic acids of the homologous series indicated above to obtain succinic anhydride from such a mixture. In the known procedure the mixture is heated in the presence of certain water-entraining agents at a temperature in the range of 175–220° C. Succinic acid in the mixture is dehydrated to the anhydride form selectively from all the other dibasic acids present therein. The water of dehydration and its entraining agent are evaporated from the resulting mixture to the exclusion of succinic anhydride. In accordance with this known method, the separation of the succinic anhydride from the other components in the evaporation residue is rendered more facile by the lixiviation thereof with liquid sulfur dioxide. While such procedure may effect a separation of the succinic values in the mixture, there are manifestly several drawbacks connected therewith. In the first place, the employment of an extraneous chemical is required, thereby increasing the cost and complexity of the process. In addition, glutaric acid still remains associated with adipic acid; these two acids cannot be separated one from the other conveniently. Of the three dibasic acid components, namely succinic acid, glutaric acid, and adipic acid, the glutaric acid is most costly when purchase thereof is made in the present day market. Hence, a treatment to recover the glutaric acid from the mixture of dibasic acids would be a desideratum of considerable economical attractiveness.

It is an object of the present invention to provide a process of reclaiming glutaric acid values and succinic acid values from a chemical process stream. A further object of the present invention is to provide a method for the continuous preparation and recovery of succinic anhydride and glutaric anhydride in high yields from a mixture of succinic acid, glutaric acid, and adipic acid, the acids being associated in the mixture in proportions such as to preclude separation one from the other by conventional selective crystallization. Another object of the present invention is to provide a process for converting the succinic acid and the glutaric acid contained in an aqueous mother liquor of the aforesaid type into succinic anhydride and glutaric anhydride and recovering substantially all the converted anhydrides, the process being carried without the introduction of an extraneous chemical. These and other objects of the invention will become more readily apparent from the following detailed description and examples.

In general, the foregoing objects are realized broadly by first subjecting liquors, such as those obtained in the manufacture of adipic acid by nitric acid oxidation of cyclohexanol and/or cyclohexanone at the point where the adipic acid is crystallized and separated from the mother liquor, to controlled conditions inducing the nitric acid, water, and other volatile substances therein to evaporate therefrom, whereby to leave a residue substantially free of these materials. The mother liquor ordinarily comprises an aqueous nitric acid solution containing succinic acid, glutaric acid, and adipic acid. As indicated above, further crystallization of adipic acid by an additional crystal cropping operation results in the simultaneous crystallization of succinic acid. However, by treating the mother liquor in accordance with the present process, succinic acid and glutaric acid in their respective anhydride forms can be separated and removed in excellent yields from such mother liquor or from similar solutions or mixtures of these dibasic acids. The anhydrides can be removed from the liquor simultaneously as a mixture; or, succinic anhydride can be removed first followed by removal of glutaric anhydride. Obviously, where the mixture is free of nitric acid and water, the removal of these substances is not essential. Next, the residue of the evaporation which has been rendered substantially free of nitric acid and water is heated at a temperature of preferably at least 225° C. and under a reduced pressure of preferably at most 100 mm. of Hg for a time sufficient to dehydrate substantially all the succinic acid and the glutaric acid to their respective anhydrides. The anhydrides so-produced, together with the water of dehydration, are distilled. Thereafter, the anhydrides are separated from the water in a suitable manner, such as by selective condensation. The water and the anhydrides are distilled simultaneously; and there is no need for the use of any extraneous agent for sweeping the water of dehydration from the system as it is formed. Preferably, the temperature to which the mixture of dibasic acids is subjected is in the range of 225–260° C. Below a temperature of 225° C., the anhydrides are not readily formed. Above 260° C., decomposition into undesired compounds becomes probable. But, a temperature as low as 190° C. or as high as 280° C. can be used. In order to distill the anhydrides so-produced the pressure must be subatmospheric; and in the aforementioned temperature range the pressure can be as high as 400 mm. of Hg. The most preferred range is 10 to 50 mm. of Hg.

The aforesaid nitric acid oxidation normally is carried out in the presence of certain oxidation catalysts. One such catalyst found useful for nitric acid oxidation is a mixed catalyst system composed of certain vanadium and copper compounds, for example ammonium vanadate and cupric nitrate. It has been found advantageous to remove these catalytic materials from the adipic acid mother liquor before the same is processed in accordance with the present invention. The separation of the catalytic material can be carried out by suitable procedures. The removal of the catalysts minimizes certain process problems such as metallic deposition in the apparatus used to effect the reclamation of the organic dibasic acids.

In one catalyst removal procedure the adipic acid mother liquor containing the vanadium-copper catalyst is passed continuously through a steam still or like vessel used in distilling liquids at a temperature between 90 and 150° C. and at a pressure of 10 to 400 mm. of Hg, wherein much of the nitric acid and water in the mother liquor is passed overhead. The removal of nitric acid is continued without complete evaporation to dryness taking place until a pH after dilution of at least 1.2 but preferably not greater than 2.2 is obtained. The residue of the evaporation can be diluted with water for ease of material handling. The precipitation of vanadium as an organic-metallic complex is effected by cooling the diluted residue. Thereafter, the vanadium precipitate is isolated from its ambient liquor. The mother liquor from the vanadium separation containing the copper catalyst is intimately contacted with a suitable cation exchange resin, whereby to remove the copper ions therefrom. The resulting liquor containing the organic dibasic acids and thus freed of catalytic material can be processed advantageously in accordance with the present invention.

In a second catalyst removal procedure, the adipic acid mother liquor at a pH of at most 1.8 is brought into reacting contact with a cation exchange resin consisting of the hydrogen form of an oxidation-resistant water-insoluble polymerizate such as a sulfonated polyvinyl aryl compound cross-linked with a suitable amount of a divinyl aryl compound. The intimate contact of the solution with the polymerizate effects the simultaneous removal of the vanadyl ions and the cupric ions. The aqueous solution is separated from the polymerizate and is thus substantially free of catalytic material. As such, it can be processed in accordance with the present invention, so as to reclaim the valuable organic material therein.

With reference in greater detail to the preferred practice of the invention, the initial procedure includes the substantial elimination of the nitric acid and water contained in the mother liquor from which the catalytic substances have been removed. The substantial elimination of the nitric acid and water can be effected in one expedient mode by evaporation under suitable pressure and temperature conditions at which these materials will be evaporated from the mother liquor. Preferably, the mother liquor is passed continuously through an evaporator of conventional construction maintained at a temperature sufficiently high to induce evaporation of substantially all the acid and water and to keep the inspissated organic dibasic acid material as a molten residue. A temperature of about 140° C. and a reduced pressure of about 140 mm. of Hg are quite suitable conditions to effect efficient evaporation. However, these conditions can be varied widely.

The dehydration of the succinic acid and glutaric acid can be carried out batch-wise or in a continuous manner. In the preferred continuous manner, the evaporated residue in molten form is flowed from a source at a predetermined rate into a fractionating column of suitable construction. The succinic acid and glutaric acid fed into the column dehydrate at a rapid rate under the aforesaid temperature and pressure conditions; and complete conversion of succinic acid to succinic anhydride and glutaric acid to glutaric anhydride occurs. The thus-produced mixture of anhydrides, together with the water of dehydration, is distilled overhead in the column. The head temperature of the column can be controlled so that succinic anhydride is removed overhead only or so that succinic anhydride and glutaric anhydride are removed overhead simultaneously. Two columns serially connected can be employed so that succinic anhydride is removed overhead in the first column and glutaric anhydride is removed overhead in the second column. Under a pressure of 10–400 mm. of Hg the head temperature of the column can range from 140–250° C.

In one embodiment the distilled anhydrides are condensed together selectively from the water by the use of a condenser maintained above the boiling point of water but below the boiling point of either anhydride. Some of the mixture of anhydrides can be returned to the column so as to effect better fractionation with the remainder of the condensate being collected as product. The anhydrides can be separated conveniently from each other by conventional fractional distillation because of the significant differences in their boiling points.

In order to obtain a more complete understanding of the present invention, reference is made now to the accompanying drawing which is a block flow diagram illustrating a continuous process system. Adipic acid mother liquor is supplied to a catalyst removal zone 10 through a conduit 12. The material supplied to the said zone may be the aqueous liquor obtained during the manufacture of adipic acid by the nitric acid oxidation of cyclohexanol and cyclohexanone in the presence of an oxidation catalyst. From the catalyst removal zone the aqueous mother liquor freed of catalyst is withdrawn and passed into an evaporating means 14 of a conventional type adapted to remove nitric acid and water from the mother liquor. The residue remaining after evaporation is a free-flowing liquid above 110° C. and exhibits melting points from 60° C. to about 100° C., depending, in the main, on the relative content of the dibasic acids therein. The nitric acid and water are removed overhead through line 16.

The evaporation residue is maintained in a liquid stage and is fed to the lower portion of a continuous distillation column 18. Line 20 interconnects this column and evaporator 14. The column is equipped with a reboiler 22. Supply lines 24, 26 and return line 28 connect the reboiler with the column. The feed rate of the evaporated residue and the withdrawal rate of the bottoms product through line 29 are controlled so that substantially all the succinic acid and glutaric acid are dehydrated to form the corresponding anhydrides thereof. The optimum boil-up to feed ratio and the reflux ratio depend, among other things, upon the design of the column, but for best results are controlled to remove as much succinic anhydride and glutaric anhydride as practicable.

As indicated above a mixture of succinic anhydride and glutaric anhydride forms under these conditions prevalent in the column and is removed therefrom, together with the water of reaction, as overhead make. Line 30 interconnects the top of column 18 with a first condenser 32 wherein the mixture of anhydrides is condensed at a temperature such that the anhydrides are condensed without the simultaneous condensation of water. Preferably this temperature is in the range of about 120–140° C., although the temperature can be varied. Part of the condensate is returned to the column as reflux through line 34 to provide more efficient fractionation. The remainder of the condensate is flowed through line 36 to a product collector 38. The anhydride product may be withdrawn therefrom through pipe 40 for further treatment, if desired. As indicated above, the anhydrides may be separated one from the other in any suitable manner, such as by fractional distillation. The steam leaving the first condenser 32 is flowed through line 42 and is condensed in a second condenser 44. The water so-condensed is removed from the system via line 46. Connecting with vacuum producing equipment so as to provide a subatmospheric pressure is line 48.

Under the conditions of the present invention succinic and glutaric acids readily dehydrate to yield cyclic anhydrides as exemplified by the following equations:

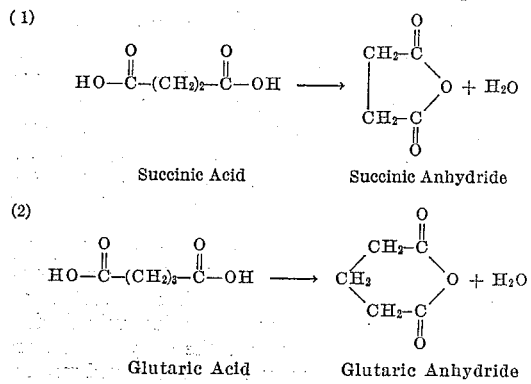

(1) Succinic Acid → Succinic Anhydride (2) Glutaric Acid → Glutaric Anhydride

The formation of these cyclic anhydrides is believed to be due to the fact that succinic and glutaric anhydrides are five and six membered rings, respectively. Such rings, in general, are relatively stable and easily formed. The bond angles and lengths for these two compounds are such that the succinic anhydride molecule has generally a planar configuration and such that glutaric anhydride molecule is generally a puckered configuration. Both configurations are relatively free of strain tending to destroy the ring structure.

Adipic acid, on the other hand, not only is more stable under these conditions, but by reason of the greater chain length, exhibits little propensity toward formation of the inner anhydride by the abstraction of water therefrom. This is probably due to the fact that adipic anhydride would be a seven membered ring and, hence, would be under considerable strain. Adipic acid, however, may form a linear polymeric anhydride of various chain lengths.

The vapor pressures of glutaric anhydride, succinic anhydride, and of adipic acid are sufficiently different so as to facilitate separation by distillation. The melting points for these compounds and their boiling points at various pressures are set forth in the following table.

TABLE 1

|  | Adipic Acid | Glutaric Anhydride | Succinic Anhydride |
| --- | --- | --- | --- |
| Melting Point, °C | 151.5 | 57 | 120 |
| Boiling Point at 760 mm. Hg | 330 | 288 | 261 |
| Boiling Point at 100 mm. Hg | 265 | 211 | 189 |
| Boiling Point at 50 mm. Hg | 244 | 189 | 169 |
| Boiling Point at 10 mm. Hg | 206 | 150 | 131 |

In order to illustrate better the invention, the following examples are given which exemplify the invention but should not be regarded as limiting the same. The parts and percentages employed herein are by weight unless otherwise indicated.

*Example I*

In a continuous manner adapted for a large scale operation, 2471 parts per hour of feed material is processed in an apparatus substantially as described above. The feed material contains about 18.8% adipic acid, 53.5% glutaric acid, and 27.7% succinic acid and is fed continuously in a molten condition through a heated line to a continuous distillation unit. The unit comprises a reboiler, a tails receiver, a column, a primary condenser, anhydride make receiver, a secondary condenser and water make receiver. The unit is equipped to operate under vacuum. The feed material is delivered into the column near the bottom thereof. The column is operated at a head pressure of 20 mm. of Hg and with a base temperature of about 250° C. After a holdup time of about one hour in the reboiler, succinic and glutaric acids are dehydrated to their respective anhydrides. The anhydrides are distilled overhead simultaneously and are condensed in the primary condenser operated at about 125° C. The condensate is removed as the anhydride product. Distilled overhead are 2166 parts per hour glutaric anhydride, 1166 parts per hour succinic anhydride, and 276 parts per hour of water. The tails of the column is withdrawn therefrom at a rate of 529 parts per hour which consists of 463 parts per hour adipic acid and 66 parts per hour glutaric acid.

The anhydride product may be marketable as a mixture of glutaric and succinic anhydrides; or if desired, the two components can be separated one from the other by distillation into substantially pure compounds. The liberated water is condensed in a secondary condenser operated at a temperature of 25° C.

*Example II*

Several continuous runs were made in a laboratory. The operating data of the runs are given below in Table 2. The composition of the feedstock in all the runs was approximately adipic acid 22.7%, glutaric acid 47.1%, and succinic acid 30.2%.

The feedstock was prepared in the laboratory by evaporating nitric acid and water from liquors obtained in the manufacture of adipic acid by nitric acid oxidation of cyclohexanol and/or cyclohexanone at the point where the adipic acid is crystallized and separated from the mother liquor. A vanadium and copper mixed catalyst system was employed during the oxidation. The evaporation was carried out at a base temperature of 140° C. and at a pressure of 140 mm. of Hg. At room temperature vanadium catalyst was removed by filtration of a 50% aqueous solution of the evaporated residue adjusted to a pH of 1.5. Copper catalyst was removed by passing the filtrate through IR 120 ion exchange resin.

The continuous distillation unit was constructed of stainless steel and consisted of a reboiler, tails receiver, a column, a primary condenser, an anhydride make receiver, a secondary condenser, and a water make receiver. The unit was equipped to operate under vacuum. The reboiler was heated with electric strip heaters. The point of attachment of the column to the reboiler was opposite to the tails withdrawal weir adapted for the continuous removal of distillation tails. The column was packed with stainless steel Octapak packing and was heated electrically to obtain adiabatic conditions therein. In the distillation head of the column an electrically controlled magnetic overhead fraction divider was employed.

The divider provided for the selected reflux ratio. The primary condenser was surrounded by a circulating oil bath which was controlled to obtain the temperature desired for proper condensation of the anhydride make without allowing the condensate to solidify. A temperature of 140° C. was maintained, this being high enough to prevent condensation of the water vapor obtained from the dehydration of succinic and glutaric acids. The secondary condenser was maintained at 25° C. by circulating water through internal coils. The unit was connected with vacuum producing equipment to maintain a low pressure within the system.

The continuous unit was placed in operation by charging the feedstock to the reboiler, placing the system under vacuum and obtaining a suitable boil-up. When the head temperature reached 120° C., a flow of fresh feed was started into the distillation column and anhydride take-off was begun. The tails stream take-off began when the level of tails in the reboiler reached the top of the overflow weir.

TABLE 2

|  | Run No. | | |
| --- | --- | --- | --- |
|  | 1 | 2 | 3 |
| Conditions: | | | |
| Feed Rate, parts/hr | 200 | 250 | 230 |
| Base Temp., ° C | 255 | 250 | 240 |
| Head Temp., ° C | 175 | 170 | 175 |
| Make/Feed Ratio | 0.60 | 0.50 | 0.56 |
| Head Pressure, mm. Hg | 20 | 20 | 20 |
| Reflux Ratio | 1 | 1 | 1 |
| Tails Streams Comp.: | | | |
| Adipic Acid, percent | 89 | 85 | 88 |
| Glutaric Acid, percent | 11 | 15 | 12 |
| Succinic Acid, percent | 0.0 | 0.0 | 0.0 |
| Anhydride Make Comp.: | | | |
| Adipic Acid, percent | 0.0 | 0.0 | 0.0 |
| Glutaric Acid, percent | 59 | 28 | 60 |
| Succinic Acid, percent | 41 | 72 | 40 |

These data show a high degree of separation of glutaric anhydride and succinic anhydride from the feedstock. The tail stream samples contained no succinic acid and only a minor amount of glutaric values.

*Example III*

Several batch runs were made, the operating data of which are given below in Table 3. The composition of the feedstock was the same as that described above in Example II. The feedstock was charged to a vacuum distillation unit comprising a flask attached to a fractionating column. The column was connected to vacuum producing equipment and was fitted with a distillation head equipped with a reflux control device. Between the head and the vacuum equipment there were a partial condenser operated at 120° C. for the selective condensation of anhydrides and a cold trap to condense the water of dehydration.

The material in the flask was heated. Two cuts of the anhydride make were made as indicated in the table below.

TABLE 3

|  | Run No. | | |
| --- | --- | --- | --- |
|  | 1 | 2 | 3 |
| Pressure, mm. of Hg: | | | |
| Cut 1 | 100 | 100 | 20 |
| Cut 2 | 10 | 10 | 20 |
| Base Temp., ° C.: | | | |
| Cut 1 | 234–252 | 231–251 | 211–222 |
| Cut 2 | 215–218 | 213–220 | 223–232 |
| Head Temp., ° C.: | | | |
| Cut 1 | 185 | 177–187 | 140–148 |
| Cut 2 | 140–149 | 141–148 | 155–162 |
| Overhead Make Analyses, Cut 1: | | | |
| Melting Point, ° C | 115–118 | ---------- | 111–116 |
| Adipic Acid, percent | 0 | 0 | 0 |
| Glutaric Anhy., percent | 2.9 | 3.2 | 5.9 |
| Succinic Anhy., percent | 97.1 | 96.8 | 94.1 |
| Overhead Make Analyses, Cut 2: | | | |
| Melting Point, ° C | 50–52 | ---------- | 52–54 |
| Adipic Acid, percent | 0 | 0 | 0 |
| Glutaric Anhy., percent | 90.4 | 88.9 | 94.5 |
| Succinic Anhy., percent | 9.6 | 11.1 | 5.5 |

From the above, it is seen that under the conditions employed succinic anhydride, in the main, is first distilled followed by distillation of glutaric anhydride.

From the practice of the invention as above described numerous advantages have been found to result. The valuable organic material that would normally be lost from the system is recovered advantageously by the disclosed process. Furthermore, a waste disposal problem of the recovered substances is obviated.

Various modifications of the invention will be apparent to those skilled in the art. Hence, it will be understood that the invention is not limited to the foregoing description or annexed drawing except as it is defined in the appended claims.

What is claimed is:

1. A process of treating a mixture of organic dibasic acids including succinic acid, glutaric acid, and adipic acid which comprises the steps of heating said mixture at a temperature of at least 190° C. under a reduced pressure for a time sufficient to dehydrate the succinic acid to succinic anhydride, distilling the so-produced succinic anhydride together with the water of dehydration, and recovering the succinic anhydride from the make of the distillation.

2. The process of claim 1 wherein the temperature is in the range of 225–260° C.

3. The process of claim 2 wherein the pressure is in the range of 10 to 50 mm. of Hg.

4. In a simultaneous dehydration-distillation process for the preparation and separation of succinic and glutaric anhydrides, the steps which comprise heating a mixture of succinic, glutaric and adipic acids to a temperature between 190° and 280° C. and at a pressure between 10 and 400 mm. Hg absolute and successively distilling from the reaction mixture—first, succinic anhydride with water of dehydration; and second, glutaric anhydride with water of dehydration.

5. A continuous process for treating a substantially dry and nitric acid free mixture of organic dibasic acids comprising essentially succinic acid, glutaric acid, and adipic acid which comprises the steps of continuously feeding said mixture in a molten state into the dehydration zone of a continuous fractionating system, heating said mixture at a temperature of at least 225° C. under a reduced pressure of at most 100 mm. of Hg for a time sufficient to dehydrate the succinic acid and the glutaric acid to their respective anhydrides, continuously distilling from the system the so-produced anhydrides together with the water of dehydration, continuously condensing the overhead product of the distillation selectively to condense the distilled anhydrides at a temperature to maintain the anhydrides as a liquid and to maintain the water as a vapor, continuously returning a portion of the condensed anhydrides to the dehydration zone, and collecting the remainder of the condensed anhydrides, thereby leaving adipic acid in the bottoms product of the distillation.

6. The process of claim 5 wherein the base temperature in the dehydration zone is in the range of 225–260° C.

7. The process of claim 6 wherein the pressure in the fractionating system is in the range of 10 to 50 mm. of Hg.

8. The process of claim 7 wherein the distilled anhydrides are condensed at a temperature in the range of about 120–140° C.

9. In the production of adipic acid manufactured by nitric acid oxidation of cyclohexanol and cyclohexanone, a process for treating the aqueous liquor obtained in the crystallization and separation of the adipic acid so-produced which comprises the steps of evaporating the said aqueous liquor to remove substantially all the nitric acid and water therefrom thereby forming a substantially dry and nitric acid free mixture of dibasic acids comprising essentially succinic acid, glutaric acid, and adipic acid, heating the said mixture at a temperature in the range of 225–260° C. under a reduced pressure of 10 to 50 mm. of Hg for a time sufficient to dehydrate the succinic acid and the glutaric acid to their respective anhydrides, distilling the so-produced anhydrides together with the water of dehydration, and recovering the anhydrides from the make of the distillation, thereby leaving adipic acid in the bottoms product of the distillation.

10. In the production of adipic acid manufactured by nitric acid oxidation of cyclohexanol and cyclohexanone, a continuous process for treating the aqueous liquor obtained in the crystallization and separation of the adipic acid so-produced which comprises the steps of evaporating the said aqueous liquor to remove substantially all the nitric acid and water therefrom thereby forming a substantially dry and nitric acid free mixture of dibasic acids comprising essentially succinic acid, glutaric acid, and adipic acid, continuously feeding said mixture in a molten state into the dehydration zone of a continuous fractionating system, heating said mixture at a temperature of at least 225° C. under a reduced pressure of at most 100 mm. of Hg for a time sufficient to dehydrate the succinic acid and the glutaric acid to their respective anhydrides, continuously distilling from the system the so-produced anhydrides simultaneously together with the water of dehydration, continuously cooling the overhead product of the distillation to condense selectively the distilled anhydrides at a temperature to maintain the anhydrides as a liquid and to maintain the water as a vapor, continuously returning a portion of the condensed anhydrides to the dehydration zone, collecting the remainder of the condensed anhydrides, and continuously withdrawing the bottoms product composed mostly of adipic acid from the system.

11. The process of claim 10 wherein the base temperature in the fractionating zone is in the range of 225–260° C.

12. The process of claim 11 wherein the pressure in the fractionating system is in the range of 10 to 50 mm. of Hg.

13. The process of claim 10 wherein the distilled anhydrides are condensed at a temperature in the range of 120–140° C.

14. The process of claim 10 in which the temperature in the dehydration zone is about 250° C. and the pressure therein is about 20 mm. of Hg.

References Cited

UNITED STATES PATENTS

| | | | |
|---|---|---|---|
| 2,918,487 | 12/1959 | Patterson et al. | 260—537 |
| 2,971,010 | 2/1961 | Gilby et al. | 260—537 |
| 2,713,067 | 6/1955 | Hamblet et al. | 260—537 |
| 2,789,136 | 4/1957 | O'Hara | 260—537 |
| 2,791,566 | 5/1957 | Jeffers et al. | 260—537 |

HENRY R. JILES, *Primary Examiner.*

I. MARCUS, A. D. SULLIVAN, WALTER A. MODANCE, *Examiners.*

M. H. SILVERSTEIN, *Assistant Examiner.*